Oct. 13, 1942.   A. C. HOFFMAN ET AL   2,299,055
EXPANDER TOOL FOR ONE TIME COUPLINGS
Filed Jan. 3, 1940   3 Sheets-Sheet 1
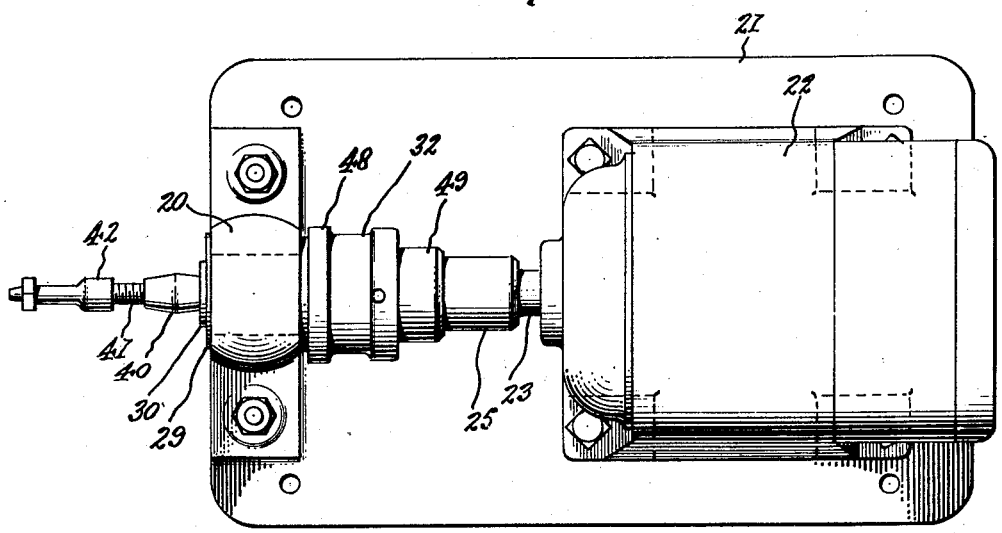
Inventors
Allan C. Hoffman
and James V. MacDonald
By Mawhinney & Mawhinney
Attorneys.

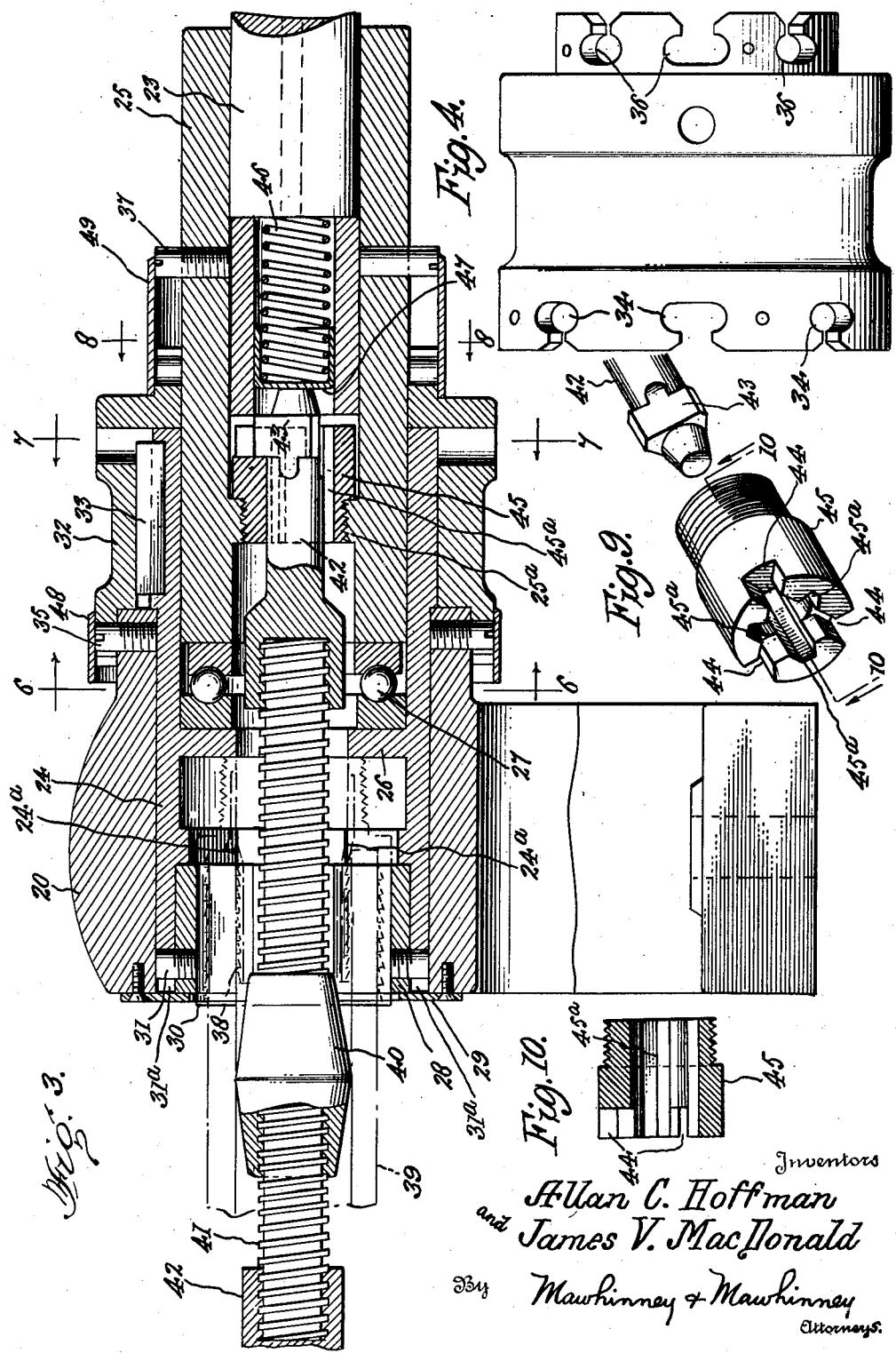

Oct. 13, 1942.    A. C. HOFFMAN ET AL    2,299,055
EXPANDER TOOL FOR ONE TIME COUPLINGS
Filed Jan. 3, 1940    3 Sheets-Sheet 3
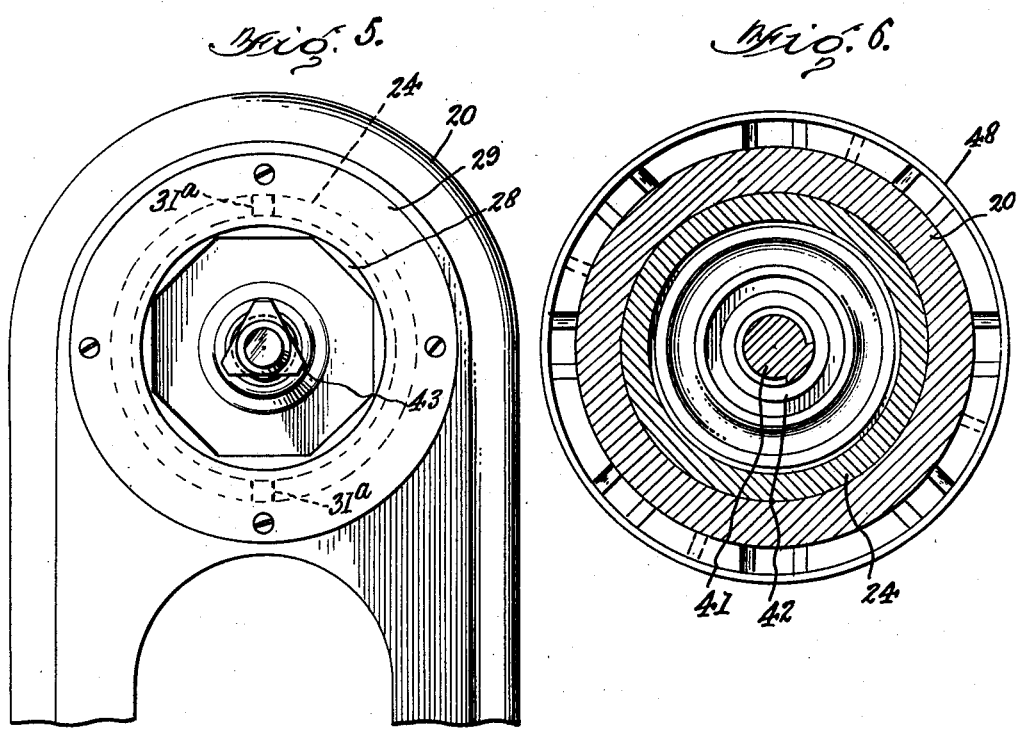
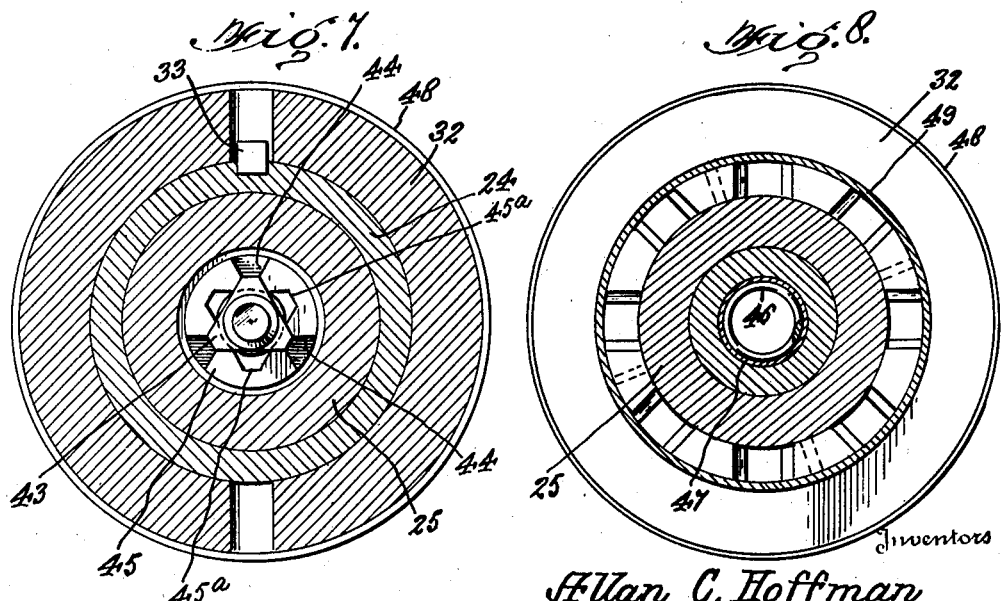
Inventors
Allan C. Hoffman
and James V. MacDonald
By Mawhinney & Mawhinney
Attorneys.

Patented Oct. 13, 1942

2,299,055

UNITED STATES PATENT OFFICE 2,299,055

EXPANDER TOOL FOR ONE TIME COUPLINGS

Allan C. Hoffman, Milldale, and James V. Mac-Donald, Oakville, Conn., assignors to Scovill Manufacturing Company, Waterbury, Conn., a corporation of Connecticut Application January 3, 1940, Serial No. 312,262

10 Claims. (Cl. 29—88.2)

The present invention relates to expanding tools for use in securing couplings on the ends of hose, and relates more particularly to an expander tool for use in applying the one time coupling, or a coupling which is permanently attached to the end of the hose by expansion of the nipple or inner part of the coupling within the end of the hose.

An object of the present invention is to provide a machine or tool of this character which may be motor driven through a reduction gear drive motor, which is provided with a socket portion for the reception of a hose coupling and with means for adjusting the machine to hold or drive the socket portion relative to an expander punch or head operable within the coupling.

Another object of the invention is to provide an expander tool of this type which admits of quick and easy adjustment of the tool for successive operations upon coupling members and which embodies an expander unit which is reversible so that when the expander punch or head of the unit is drawn through a coupling it may me quickly detached and the unit reversed so as to dispose the head in an outermost position for operation on the next coupling member without requiring a reverse operation of the machine for positioning the parts in their initial positions.

The invention further aims to provide in a machine of this character a construction including a thrust bearing so disposed as to take up wear and longitudinal thrust through a single bearing advantageously disposed at a strongly braced and constructed portion of the machine and tool, and which is so disposed as to admit of compactness in the tool construction without sacrifice of proportions of the parts to secure the necessary strength and wear and admit of the quick reversal of interchange of the connected parts of the tool.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a side elevation of an expander tool for one time hose coupling embodying the features of this invention.

Figure 2 is a top plan view of the same.

Figure 3 is a fragmentary enlarged sectional view taken substantially vertically and longitudinally through the tool, the motor being omitted.

Figure 4 is a detail side elevation of the clutch collar employed.

Figure 5 is an outer end view of the expander tool ready to receive a hose coupling therein.

Figure 6 is a transverse section taken through the tool on the line 6—6 of Figure 3 and looking toward the outer end of the clutch collar.

Figure 7 is a transverse section taken on the line 7—7 of Figure 3 through the inner end of the clutch collar and looking toward the adjacent end of the reversible expander unit.

Figure 8 is a similar view taken through the inner reduced end of the clutch collar and adjacent parts substantially on the line 8—8 of Figure 3 and looking toward the outer end of the tool.

Figure 9 is a detail perspective view of the interlocking socket joint for the reversible expander unit, and Figure 10 is a detail longitudinal section through the socket bushing of the joint.

Referring now to the drawings, 20 designates a hub frame adapted to be mounted in any suitable manner, such as upon a base 21 to which may also be secured a reduction gear motor 22 having a drive shaft 23 which operates the expander tool.

The hub frame 20 is provided with a cylindrical bore into which is rotatably fitted the forward end of an adaptor sleeve 24. The rear end of the adaptor sleeve receives rotatably therein the forward end of a drive sleeve 25 which is mounted on the shaft 23 to turn therewith. The adaptor sleeve 24 has an intermediate web or partition 26 which is disposed opposite the forward end of the drive sleeve 25 and a suitable thrust bearing 27 is interposed between the web 26 and the end of the sleeve 25 to take up wear and longitudinal thrust imposed upon the drive sleeve 25 and the adjacent parts of the tool.

The adaptor sleeve 24 is recessed at its outer end to receive a selected adaptor 28 which may be detachably held within the forward end of the sleeve 24 by a retaining ring 29 secured by screws or the like to the outer side of the hub frame 20. The adaptor 28 has an internal configuration for the reception of a hose coupling 30 which is adapted to be held securely from turning within the adaptor 28 and its sleeve 24. The adaptor 28 may be provided with radial studs 31 which engage in recesses or slots 31ᵃ in the forward end of the adaptor sleeve 24 for the purpose of holding the adaptor against turning in the sleeve. Of course the configuration and the structure of the adaptor 28 is modified to accommodate coupling members of different shapes and sizes so that the expander tool may be used with substantially any size and type of expansion coupling.

The adaptor sleeve 24 may be locked to the hub frame 20 to hold the sleeve against turning, or may be locked to the drive sleeve 25 to turn therewith. This selected interlocking of the adaptor sleeve 24 is accomplished by means of a clutch 32 of sleeve form slidable partly upon the rear end of the adaptor sleeve 24 and reduced or stepped for engagement upon the drive sleeve 25. The clutch sleeve 32 is connected by a key 33 to the adaptor sleeve 24 to hold the clutch sleeve from turning on the adaptor sleeve but admitting of the axial or longitudinal shifting of the clutch sleeve on the adaptor sleeve. The forward end of the clutch sleeve 32 is provided with laterally recessed sockets 34 opening through the forward end of the sleeve and adapted to receive therein radial studs 35 carried upon the hub frame 20 for securing the clutch sleeve thereto when the clutch sleeve is shifted forwardly to interlock the studs 35 within the recessed sockets 34.

The rear reduced end of the clutch sleeve 32 is provided with similar sockets 36 adapted to engage radial studs or pins 37 projecting from the drive sleeve 25 for interlocking the clutch sleeve thereto when the clutch sleeve is shifted rearwardly and free from the hub frame 20. In the latter case the adaptor sleeve 24 is interlocked with the drive sleeve 25 and is rotated therewith so as to turn the hose coupling 39 which is carried in the adaptor 28.

The types of coupling members 39 upon which this expander tool is adapted to operate are provided with nipples or inner parts 38 adapted to receive the end of a hose 39 thereover and to be expanded in the end of a hose for compressing and locking the end of a hose within the coupling member. To effect this operation the machine is provided with an expander punch or head 40 which tapers towards opposite ends so that it may be introduced from either end into the nipple 38 and drawn through the nipple to expand it within the hose.

The expander head 40 is mounted in threaded relation upon a drive screw or spindle 41 adapted to be turned within the head 40 for advancing the head axially along the screw and through the nipple. The drive screw 41 may be threaded throughout its entire length and is provided upon opposite ends with similar or like quick connector shanks 42. Each shank 42 is provided at one end with an internally threaded socket adapted to engage upon the adjacent end of the drive screw 41 and, at its other end, is provided with a triangular head 43 adapted to seat in corresponding recesses 44 provided upon the inner end of a socket bushing 45 threaded into a rib 35ª disposed within the outer end of the drive sleeve 25 or otherwise fixed thereto. The socket bushing 45 has triangularly arranged slots 45ª in its inner wall and which extend throughout the length of the bushing 45 to receive the head 43 when turned to register with the slots. The recesses 44 in the bushing 45 are radial and offset angularly between the slots 45ª so that the triangular head 43, when advanced entirely through the bushing 45, may be turned through a predetermined angle to register the projections of the head with the recesses 44. The forward end of the drive shaft 23 is hollow and carries a compression spring 46 upon the forward end of which is disposed a bearing cap 47 adapted to bear against the outer projecting end of the triangular head 43 and normally urges the latter under spring pressure into interlocking engagement with the bushing 45.

The head 43, when thus interlocked with the bushing 45, provides a driving connection between the motor shaft 23 and the drive screw 41. The expander head unit is thus detachable and reversible, and may be quickly removed from the drive shaft 23 by pressing inwardly upon the drive screw 41 to unseat the projections of the head 43 from the recesses 44 of the bushing 45, and turning the drive screw 41 with the head 43 to register the projections of the head with the longitudinal slots 45ª. It will be noted that the quick detachable shank 42 and its head 43 are of less exterior diameter than that of the nipple 38 before expansion, so that the innermost shank and head may be quickly and easily slipped through the reduced portion of the nipple 38 and interlocked with the bushing 45 preliminary to the expansion operation. After the expansion operation has taken place, the coupling secured to the hose may be readily withdrawn from the expander and the quick detachable shank 42 may then be quickly reversed and inserted through the nipple of the next coupling placed in the machine for the expansion operation.

In the use of this expander tool the coupling 39 to be expanded is first inserted in the adaptor 28. The expander punch or head unit, comprising the drive screw 41 with its head 40 and adjacent parts, is inserted at one end through the coupling nipple 38 and with the shank head 43 aligned with the slots 45ª through the bushing 45; at which time the shank head 43 is inserted through the bushing and against the spring operated cap 47. The head 43 is now turned to register its projections with the recesses 44 of the bushing 45, and is released so that the spring 46 interlocks the head 43 in the bushing 45.

When in this position the expander punch or head 40 must be disposed forwardly of the coupling member 39 as shown in Figure 3. The clutch sleeve 32 is now shifted into its rearmost position so as to interlock the adaptor sleeve 24 with the drive sleeve 25. The motor 22 is now started and the operator holds the expander punch or head 40 stationary by hand to keep it from turning so that the drive screw 41 may advance the head 40 toward the adjacent end of the nipple 38 and bind therein. The machine is now stopped.

The end of the hose 39 is now slipped over the projecting end of the expander unit and is aligned with the nipple 38. The motor is again started and the operator, while tightly holding on to the hose to keep it from turning, forces the hose inwardly against the coupling while the latter is turning so that the hose is quickly and easily fed up over the nipple 38, particularly when the coupling member is provided with helical threads. To facilitate this operation and permit the operator to use both of his hands in holding the hose while the coupling is being rotated, especially when the hose is inserted into the coupling preliminary to the expansion operation, the motor may be controlled from a foot-operated switch, not shown, placed conveniently on the floor so that the motor may be started and stopped as occasion requires without releasing either hand from the hose. The hose 39 is now disposed up in the coupling to its full extent, as shown in dotted lines in Figure 3. When assembling the hose 39 into the coupling 39, the entire interior mechanism consisting of the sleeve 24, adapter 28, drive sleeve 25 and drive screw 41, as well as the coupling 39 itself, is all caused to rotate together at a common speed. The expander head 40 is also caused to rotate with these parts at the same common speed because it has been wedged into the adjacent end of the coupling nipple 38. Consequently drive screw 41 and its expander head 40 are rotated together whereby there is no force set up to move the expander head 40 axially with relation to the coupling 39 and its nipple 38. Any tendency for the friction of the hose 39 to check the rotation of the expander head 40 in assembling the hose thereover only causes said expander head 40 to embrace the end of the nipple 38 more firmly, overcoming such friction of the hose and requiring the continued rotation of the expander head 40 with the other elements.

When the hose 39 has been assembled fully to the coupling 30 and its nipple 38, the clutch sleeve 32, with the motor stopped, is disengaged from the pins 37 of the drive sleeve 25 and shifted forwardly into interlocking engagement with the hub studs or pins 35, which action locks the adapter sleeve against rotation and consequently also locks the adapter and the coupling 30 against rotation. In this shifted position of the clutch, the motor shaft 23 drives the drive sleeve 25 and the drive screw 41. However the firm frictional contact between the now stationary coupling 30 and expander head 40 will require that said expander head 40 cease rotation. The drive screw 41 rotating relatively through the non-rotatable expander head 40 will now cause such expander head 40 to move with a motion of translation through the nipple 38, causing the expansion of the nipple outward radially against the end of the hose 39 which is included between the nipple 38 and the concentrically outer portion of the coupling 30.

After the punch or expander head 40 has been drawn through the expansible section of the nipple 38, the assembled coupling and hose may then be readily slipped out of the machine and from the projecting end of the expander unit. At this time the expander head 40 is disposed within the adaptor sleeve 24 and beyond the adaptor socket. It is only necessary to release the engaged head 43 and withdraw the expander unit from the tool and reverse the expander unit so as to dispose the other shank 42 within the tool and interlock the other head 43 with the bushing 45. This supports the expander punch or head 40 in a reversed position but outwardly of the hub frame without the necessity of reversing the machine and losing the time required for axially feeding the head 40 out into initial position. The expander unit may be quickly and easily reversed so that the machine may be used for rapidly securing the coupling members on hose ends without interruption.

For the purpose of protecting the operator's fingers from being mutilated or taken off, the clutch sleeve 32 may be provided at opposite ends with cover rings 48 and 49 which are of sufficient width to cover the respective pins or studs 35 or 37 and the sharp edges of the rotating members. Incidentally the cover rings 48 and 49 maintain the recessed sockets 34 and 36 from accumulations of grit, dust and the like which otherwise might accumulate in these parts and offset the proper interlocking of the clutch when shifted.

In Figure 3 the expander head or member is shown in what may be termed an "initial" position with reference to the coupling 30 and its nipple 38. After the expander head 40 is driven through the nipple 38 it assumes what may be termed a "final" position with respect to the coupling being operated upon. However due to the reversibility of the drive screw 41 what has been the "final" position of the expander head 40 becomes again its "initial" position and this is all due not to any change in relative position of the expander head 40 with reference to drive screw 41 but solely because of the reversing end for end of the drive screw 41. Thus without in any way disturbing the relative arrangement of drive screw 41 and its expander head 40 the transformation from "final" to "initial" position of the expander head 40 is accomplished. In other words the reversal of parts is accompanied by a critical change in position of the expander head 40 with reference to the work to be done. And this critical change is brought about without incurring any relative change between drive screw 41 and expander head 40; or otherwise stated without reverse motor operation and without reverse rotation of drive screw 41 and without critical stopping of the motor on such reverse rotation to achieve the "initial" position of the expander head 40. The reversibility end for end of the drive screw 41 to change the expander head 40 from a final to an initial position is made possible by the duplex formation of the expander head 40 in the form of two conic frustums with their base lines joining and their narrow leading edges remote from one another. The expander head 40 is thus constructed to perform its expanding operation when moved from either of its ends through the nipple 38. While the motive and carrying shaft or member 41 is reversible the expander 40 is not reversed relative to its motive and carrying shaft 41 but only to the nipple 38. Thus while maintaining its position upon its motive and carrying member 41, the expander 40 not only changes its relation from final to initial position with respect to nipple 38 but is reversed end for end with respect to such nipple.

What is claimed is:

1. An expander tool comprising a body portion having an adaptor sleeve rotatably mounted therein and provided at its outer end with a socket for the reception of a hose coupling member of the expansible nipple type adapted to receive the end of a hose over the nipple, a rotatable drive shaft projecting axially into the rear end of the adaptor sleeve, a two-way clutch device carried by the adaptor sleeve for alternate interlocking engagement with the body portion and with said drive shaft for respectively holding the adaptor sleeve from turning during the expanding operation of the tool and for connecting the adaptor sleeve to the drive shaft for rotation of the adaptor sleeve with the coupling member therein for application of the hose end to the coupling member, and an expander unit connected to said drive shaft and having an expander head for advancement through the nipple to expand the same within the hose.

2. In a machine for expanding couplings, a receiver for a coupling adapted to hold the same against movement, an expander having oppositely directed expanding means whereby the expander is adapted to have either end advanced toward said coupling and receiver to cause expansion of the coupling, an elongated motive member along which the expander is adapted to move in executing its expanding operation from an initial to a final position, means coupling said member to said expander so that operation of said member will force said expander therealong, driving means for said member, and means whereby either end of said motive member may be coupled to said driving means so that, at the end of an expanding operation wherein said expander has advanced to the then coupled end of said member, said member may be uncoupled, turned end for end, and have its other end coupled to said driving means to place the expander in an initial position relative to an expanding operation, said expander then being adjacent the then uncoupled end of said member.

3. In a machine for expanding couplings, a duplex expander having oppositely directed expanding means whereby the expander is adapted to have either end advanced toward a coupling to cause expansion of the coupling, an elongated motive member along which the expander is adapted to move in executing its expanding operation from an initial to a final position, means coupling said member to said expander so that operation of said member will force said expander therealong, driving means for said member, and means whereby either end of said motive member may be coupled to said driving means so that, at the end of an expanding operation wherein said expander has advanced toward the then coupled end of said member, said member may be uncoupled, turned end for end, and have its other end coupled to said driving means to place the expander in an initial position relative to an expanding operation.

4. In a machine for expanding hose couplings and the like, a holder for the hose coupling, an expander movable through said hose coupling from an initial to a final expanding position and constructed to expand the coupling on movement of the expander in either direction, a drive screw having threaded engagement through said expander, drive means for rotating said drive screw, and means for detachably coupling the opposite ends of said drive screw with said drive means whereby said drive screw can be removed, after said expander reaches a final position, and its opposite end coupled to said drive means to cause the restoration of said expander from final to initial position thereby making it unnecessary to change the relative position of said expander along said drive screw.

5. In a machine for expanding hose couplings and the like, a fixed support, a holder for a coupling rotatably mounted in said support, drive means, a shiftable clutch connection for connecting said holder in driven relation with said drive means to rotate the holder and coupling as when a hose is being assembled to the coupling or to fixedly couple said holder to said fixed support for holding the coupling against rotation during the expansion thereof, and means for expanding said coupling upon the hose.

6. In a machine for assembling hose to couplings in which the coupling has an expansible part, a rotatable holder in which the coupling is fixedly mounted, an expander for expanding the expansible part of the coupling and movable relatively to the coupling on its expanding stroke, a rotary operating member for the expander, cooperating means associated with the expander and rotary operating member for moving the expander through said expansible part of the coupling upon rotation of said operating member, drive means for rotating said operating member, and shiftable clutch means for operatively connecting said holder to either said drive means or to a fixed part of said machine, the former clutch connection rotating said holder to facilitate the insertion of the hose into the coupling and the latter clutch connection maintaining the holder against rotation while the rotary operating member draws said expander through said coupling.

7. In a machine for assembling hose to couplings, a rotatable holder in which the coupling is fixedly mounted, an expander for expanding the coupling and movable relatively to the coupling on its expanding stroke, a rotary operating member for the expander, cooperating means associated with the expander and rotary operating member for moving the expander through the coupling upon rotation of said operating member, drive means for rotating said operating member, and means for operatively connecting said holder to either said drive means or to a fixed part of said machine, wherein the connection of the holder to the drive means rotates said holder to facilitate the insertion of hose into the coupling and the connection of the holder to the fixed part of the machine maintains the holder against rotation while the rotary operating member draws the expander through said coupling.

8. In a machine for expanding couplings, a receiver for a coupling adapted to hold the coupling against movement of translation, an expander having oppositely directed expanding means whereby the expander is adapted to have either end advanced toward and within said coupling and receiver to cause expansion of the coupling, an elongated rotary motive member along which the expander is adapted to move in executing its expanding operation from an initial to a final position, means coupling said member to said expander so that operation of said member will force said expander therealong, driving means for rotating said member, a coupling member on the driving means, and a complemental coupling member on each end of said motive member whereby either end of said motive member may be coupled to said driving means so that, at the end of an expanding operation wherein said expander has advanced toward the then coupled end of said motive member from initial to final position, said motive member may be uncoupled, turned end for end, and have its other end coupled to said driving means to place the expander in the initial position relative to a subsequent expanding operation.

9. In a machine for assembling hose to couplings comprising a body and a coupling receiver rotatably mounted therein, a driven motive means, interlocking means connected to said receiver and connectible to said driven motive means for rotating said receiver to assist in the initial assembly of the hose to the coupling, and an expander unit detachably connected to said driven motive means, means on said body for engagement with said interlocking means to lock said body and receiver against relative movement, whereby said interlocking means is adapted to be disengaged from said driven motive means and interlocked with said engaging means on said body to preclude rotation of said receiver while said expander unit is operated by said driven motive means to expand said coupling to said hose subsequent to the initial assembly operation.

10. In a machine for assembling hose to couplings, means for receiving a coupling, rotary driven motive means, means selectively connecting said receiving means to said driven motive means to assist in the initial assembly of the hose to the coupling, an expander unit connected to said driven motive means, and means for selectively locking said coupling receiving means against rotation during the operation of said expander unit in expanding the coupling to the hose following the initial hose essembly operation and the disengagement of said selective connecting means.

ALLAN C. HOFFMAN.
JAMES V. MacDONALD.